US011682247B2

(12) United States Patent
Suzuki et al.

(10) Patent No.: US 11,682,247 B2
(45) Date of Patent: Jun. 20, 2023

(54) VEHICLE CONTROL SYSTEM (71) Applicant: ASAHI DENSO CO., LTD., Hamamatsu (JP)

(72) Inventors: Michiyuki Suzuki, Hamamatsu (JP); Syunsuke Omura, Hamamatsu (JP)

(73) Assignee: ASAHI DENSO CO., LTD., Shizuoka (JP)

( * ) Notice: Subject to any disclaimer, the term of this patent is extended or adjusted under 35 U.S.C. 154(b) by 133 days.

(21) Appl. No.: 16/676,808

(22) Filed: Nov. 7, 2019

(65) Prior Publication Data
US 2020/0151968 A1 May 14, 2020

(30) Foreign Application Priority Data
Nov. 8, 2018 (JP) .............................. JP2018-210847

(51) Int. Cl.
*G07C 5/08* (2006.01)
*B62D 15/02* (2006.01)
(Continued)

(52) U.S. Cl.
CPC ............. *G07C 5/085* (2013.01); *B60W 40/08* (2013.01); *B60W 40/09* (2013.01); *B60W 40/10* (2013.01);
(Continued)

(58) Field of Classification Search
CPC ....... G07C 5/085; B60W 40/08; B60W 40/09; B60W 40/10; B60W 40/105; B60W 2050/0001; B60W 40/12; B62D 15/021; F16H 59/02; F16H 2059/0234; B60T 7/04; B60T 7/042; B60T 7/085; B60T 17/22;
(Continued)

(56) References Cited

U.S. PATENT DOCUMENTS 5,680,122 A 10/1997 Mio
8,423,246 B2 * 4/2013 Takeda ................... B62D 5/006
701/41
(Continued)

FOREIGN PATENT DOCUMENTS

CN 101708702 A 5/2010
DE 44 45 903 A1 7/1996
(Continued)

OTHER PUBLICATIONS

Extended European Search Report issued in Patent Application No. EP 19207637.0 dated Feb. 18, 2020.
(Continued)

*Primary Examiner* — Tyler J Lee
(74) *Attorney, Agent, or Firm* — Pearne & Gordon LLP (57) ABSTRACT A vehicle control system includes: an operation unit disposed in a vehicle and operable by a driver; an operation detection unit configured to detect an operation on the operation unit, and including a displacement unit that is displaced according to an operation amount of the operation unit, and a detection unit that detects a displacement amount of the displacement unit and that outputs a continuous signal according to the displacement amount; and a control unit that inputs the continuous signal detected by the detection unit and performs a predetermined control corresponding to the continuous signal is provided.

4 Claims, 9 Drawing Sheets (51) Int. Cl.
  *B60W 40/08* (2012.01)
  *B60W 40/09* (2012.01)
  *B60W 40/10* (2012.01)
  *B60T 7/04* (2006.01)
  *F16H 59/02* (2006.01)
  *B60W 40/105* (2012.01)
  *B60W 50/00* (2006.01)
  *B60W 40/12* (2012.01)

(52) U.S. Cl.
  CPC .............. *B62D 15/021* (2013.01); *B60T 7/04* (2013.01); *B60W 40/105* (2013.01); *B60W 40/12* (2013.01); *B60W 2050/0001* (2013.01); *F16H 59/02* (2013.01); *F16H 2059/0234* (2013.01)

(58) Field of Classification Search
  CPC . B62K 23/06; B62K 21/00; B62L 3/04; B62J 45/41
  See application file for complete search history.

(56) References Cited

U.S. PATENT DOCUMENTS

| | | | |
|---|---|---|---|
| 9,193,337 B2 * | 11/2015 | Kinoshita | B60T 7/122 |
| 10,077,072 B2 * | 9/2018 | Hori | B62D 5/0463 |
| 10,173,719 B2 * | 1/2019 | Sakaguchi | B62D 5/0463 |
| 2001/0006059 A1 * | 7/2001 | Lee | F02D 11/105 |
| | | | 123/436 |
| 2002/0153771 A1 * | 10/2002 | Obuchi | B60T 8/92 |
| | | | 303/155 |
| 2003/0055538 A1 * | 3/2003 | Yanaka | B60W 10/04 |
| | | | 701/1 |
| 2004/0128057 A1 * | 7/2004 | Kitazawa | G05B 11/42 |
| | | | 701/110 |
| 2004/0189454 A1 | 9/2004 | Shimoyama | |
| 2008/0125285 A1 | 5/2008 | Takeuchi | |
| 2008/0154460 A1 * | 6/2008 | Uenuma | B60N 2/0244 |
| | | | 701/36 |
| 2010/0318256 A1 | 12/2010 | Breuer et al. | |
| 2012/0145493 A1 | 6/2012 | Nishikawa et al. | |
| 2013/0173099 A1 * | 7/2013 | Takagi | B60K 6/52 |
| | | | 701/22 |
| 2014/0183936 A1 * | 7/2014 | Kinoshita | B60T 7/122 |
| | | | 303/20 |
| 2015/0035352 A1 * | 2/2015 | Fujiki | B60T 13/66 |
| | | | 303/15 |
| 2015/0142290 A1 * | 5/2015 | Van Saanen | G05G 1/38 |
| | | | 701/70 |
| 2015/0266468 A1 * | 9/2015 | Moon | B60W 10/02 |
| | | | 701/22 |
| 2015/0314803 A1 * | 11/2015 | Kojo | B62D 5/0484 |
| | | | 701/43 |
| 2017/0088176 A1 * | 3/2017 | Tamura | B62D 15/025 |
| 2018/0086340 A1 * | 3/2018 | Nagatsuka | B60W 30/0953 |
| 2018/0162354 A1 * | 6/2018 | De Hesselle | B60K 17/354 |
| 2018/0273026 A1 * | 9/2018 | Oyama | B60W 10/20 |
| 2018/0304872 A1 * | 10/2018 | Kim | B60T 8/175 |
| 2019/0126971 A1 * | 5/2019 | Kim | B62D 15/0215 |
| 2019/0184953 A1 * | 6/2019 | Ishida | B60T 8/171 |
| 2019/0275994 A1 * | 9/2019 | Zhao | B60L 15/20 |
| 2020/0003143 A1 * | 1/2020 | Dudar | B60W 10/22 |
| 2020/0122735 A1 * | 4/2020 | Sakaguchi | B60W 40/114 |
| 2020/0130667 A1 * | 4/2020 | Bull | B60T 13/662 |
| 2020/0164842 A1 * | 5/2020 | Ishida | B60T 8/17 |

FOREIGN PATENT DOCUMENTS

| | | |
|---|---|---|
| EP | 2 026 287 A2 | 2/2009 |
| GB | 2495617 A | 4/2013 |
| JP | H05-170008 A | 9/1993 |
| JP | H09-91999 A | 3/1997 |
| JP | 2005-047494 A | 2/2005 |
| JP | 2008-132868 A | 6/2008 |
| JP | 2012-121458 A | 6/2012 |
| JP | 2013-082440 A | 5/2013 |
| TW | 2009-00291 A | 1/2009 |
| WO | 2009-049697 A1 | 4/2009 |

OTHER PUBLICATIONS

Taiwanese Office Action dated Oct. 20, 2022 issued in Taiwan Patent Application No. 108140422.
Japanese Office Action dated Nov. 11, 2022 issued in Japanese Patent Application No. 2018-210847.
Japanese Office Action dated Apr. 14, 2023 issued in Japanese Patent Application No. 2018-210847.

* cited by examiner

VEHICLE CONTROL SYSTEM

CROSS-REFERENCE TO RELATED APPLICATIONS

This application is based upon and claims the benefit of priority from prior Japanese patent application No. 2018-210847, filed on Nov. 8, 2018, the entire contents of which are incorporated herein by reference.

TECHNICAL FIELD

The present invention relates to a vehicle control system including an operation unit disposed in a vehicle and operable by a driver and an operation detection unit configured to detect an operation on the operation unit.

BACKGROUND ART

Operation units such as a brake lever are usually provided in a vehicle such as a motorcycle, and any operation (such as a brake operation) can be performed by operating these operation units. For example, when a driver swings while gripping the brake lever, an actuation portion such as a tact switch is pressed on a part of the brake lever that is to be electrically turned on, so that a brake lamp of the vehicle can be turned on.

However, the related art has the following problems.

There is an increasing need to grasp quality of driving and a situation during an accident by storing information on a traveling state of the vehicle in real time and outputting the stored information on the traveling, and thus, for example, a drive recorder has been proposed. However, although the drive recorder can store a video during traveling, whether the operation unit such as the brake lever or a clutch lever is operated and an operation amount thereof cannot be grasped.

In recent years, various studies have been made on achieving smooth traveling and safe traveling by communicating information on the traveling state between the vehicle the driver drives and other vehicles. In such a situation, for example, when the brake lever is detected only by turning the tact switch on and off, information on by how much operation amount the brake lever is operated cannot be obtained, and the information communicated between the vehicles is insufficient.

The present invention has been made in view of the above circumstances, and an object thereof to provide a vehicle control system that is capable of detecting an operation amount of an operation unit and further enriching and utilizing information on traveling.

SUMMARY OF INVENTION

According to an aspect of the invention, there is provided a vehicle control system comprising: an operation unit disposed in a vehicle and operable by a driver; an operation detection unit configured to detect an operation on the operation unit, and including a displacement unit that is displaced according to an operation amount of the operation unit, and a detection unit that detects a displacement amount of the displacement unit and that outputs a continuous signal according to the displacement amount; and a control unit that inputs the continuous signal detected by the detection unit and performs a predetermined control corresponding to the continuous signal is provided.

DESCRIPTION OF EMBODIMENTS

Hereinafter, an embodiment of the present invention will be described in detail with reference to the drawings.

Figure 1:
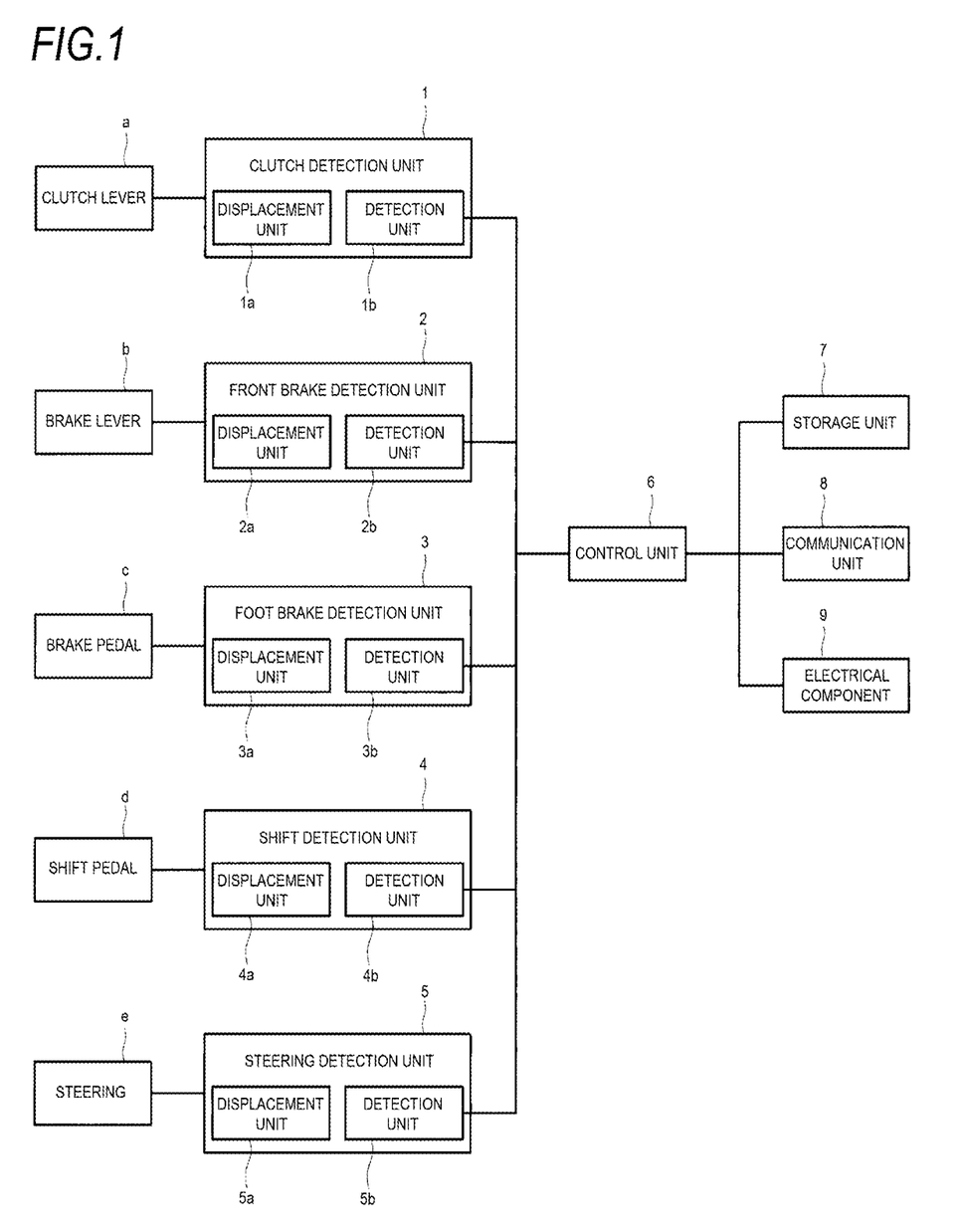
FIG. 1 is a block diagram showing a vehicle control system according to an embodiment of the present invention.

A vehicle control system according to the present embodiment is for detecting an operation on an operation unit such as a brake lever disposed in a motorcycle (a vehicle), and includes a clutch lever a, a brake lever b, a brake pedal c, a shift pedal d and a steering e as operation units, a clutch detection unit 1, front brake detection unit 2, a foot brake detection unit 3, a shift detection unit 4 and a steering detection unit 5 as operation detection units, and a control unit 6 as shown in FIG. 1.

The clutch lever a (an operation unit) is an operation lever that is attached in vicinity of a left gripped grip on a handlebar of the motorcycle, and that allows a driver to perform a clutch operation by swinging while gripping the gripped grip. The brake lever b (an operation unit) is an operation lever that is attached in vicinity of a right throttle grip on the handlebar of the motorcycle, and that allows the driver to perform a brake operation on a front wheel by swinging while griping the throttle grip.

Figure 2:
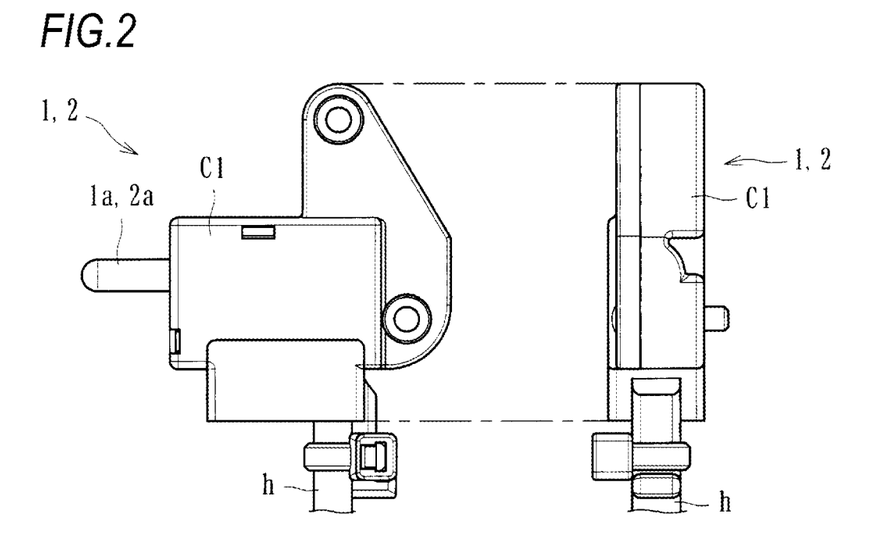
FIG. 2 is a two-side view showing an operation detection unit that detects an operation amount of a clutch lever or a brake lever in the vehicle control system.
Figure 3:
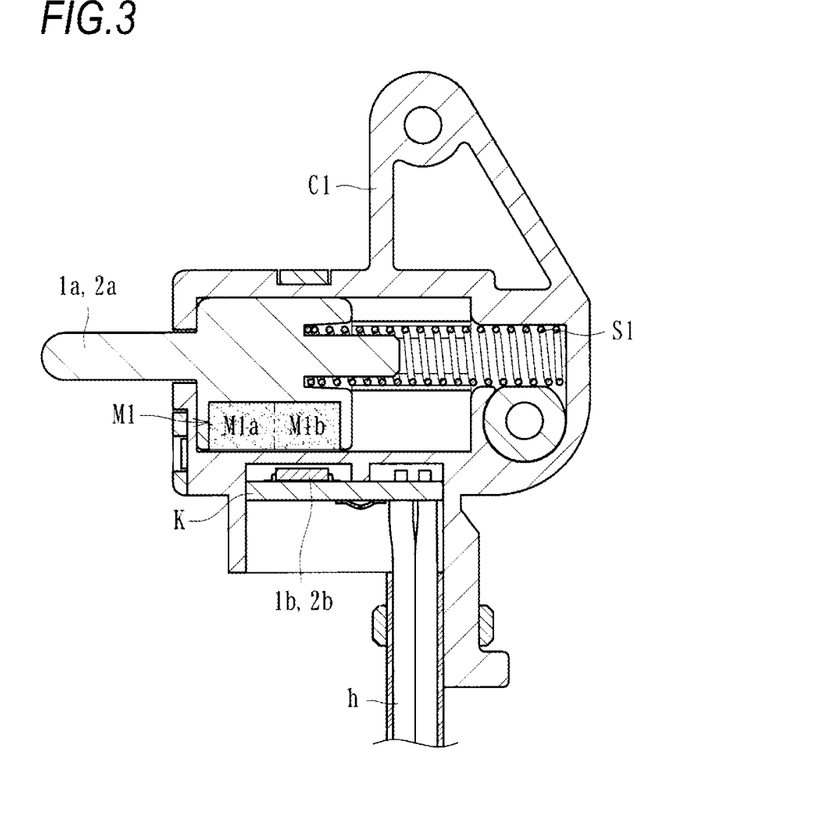
FIG. 3 is a cross-sectional view showing the operation detection unit.

The clutch detection unit 1 and the front brake detection unit 2 are for detecting operations on the clutch lever a and the brake lever b, and include a displacement unit (1a, 2a), a detection unit (1b, 2b), a spring S1 and a case C1 as shown in FIGS. 2 and 3. The case C1 is attached in vicinity of the clutch lever a and the brake lever b in the motorcycle, and the displacement unit (1a, 2a) is displaceably accommodated in the case C1.

The displacement unit (1a, 2a) is displaced according to an operation amount of the clutch lever a and the brake lever b. When the clutch lever a and the brake lever b are swung, the displacement unit (1a, 2a) is pressed by a part of the clutch lever a or the brake lever b and can be slid (be displaced) linearly toward a right side in FIG. 3 against an urging force of the spring S1. The displacement unit (1a, 2a) is configured such that a magnet M1 is attached to a predetermined position and the magnet M1 is displaced together with the displacement unit (1a, 2a).

The magnet M1 is disposed such that different polarities (for example, a portion M1a is an S pole and a portion M1b is an N pole, or the portion M1a is the N pole and the portion M1b is the S pole) are arranged in a displacement direction of the displacement unit (1a, 2a), and magnetism exerted on the detection unit (1b, 2b) can be changed with displacement of the displacement unit (1a, 2a). The magnet M1 may be a permanent magnet or a magnet obtained by magnetizing a predetermined position of the displacement unit (1a, 2a).

The detection unit (1b, 2b) detects a displacement amount of the displacement unit (1a, 2a) and outputs a continuous signal corresponding to the displacement amount, and is formed of a Hall IC (a magnetic sensor) attached to a substrate K in the present embodiment. The Hall IC obtains an output voltage corresponding to a magnetic change from the magnet M1, and is fixed at a position facing the magnet M1 in the case C1. The detection unit (1b, 2b) is electrically connected to the control unit 6 on a vehicle side by a wiring h, and the obtained output voltage (the continuous signal corresponding to the displacement amount) is output to the control unit 6.

Figure 11:
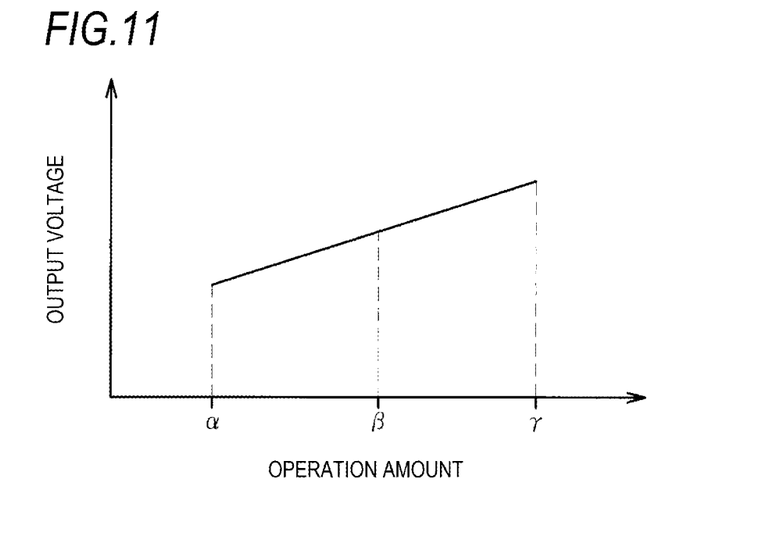
FIG. 11 is a graph showing an output voltage output from the detection unit of the vehicle control system according to the present embodiment.

However, when the clutch lever a or the brake lever b is swung and the displacement unit (1a, 2a) is slid (is displaced) in the case C1, and accordingly the magnet M1 is displaced to change the magnetism exerted on the detection unit (1b, 2b), a linear output voltage can be obtained by the detection unit (1a, 1b) as shown in FIG. 11. That is, when output voltages of operation amounts α, β and γ on the clutch lever a or the brake lever b are plotted on a graph and connected with a line, a continuous signal corresponding to displacement amounts of the displacement unit (1a, 2a) (the operation amounts α, β and γ on the clutch lever a or the brake lever b) can be obtained as shown in the drawing.

Figure 4:
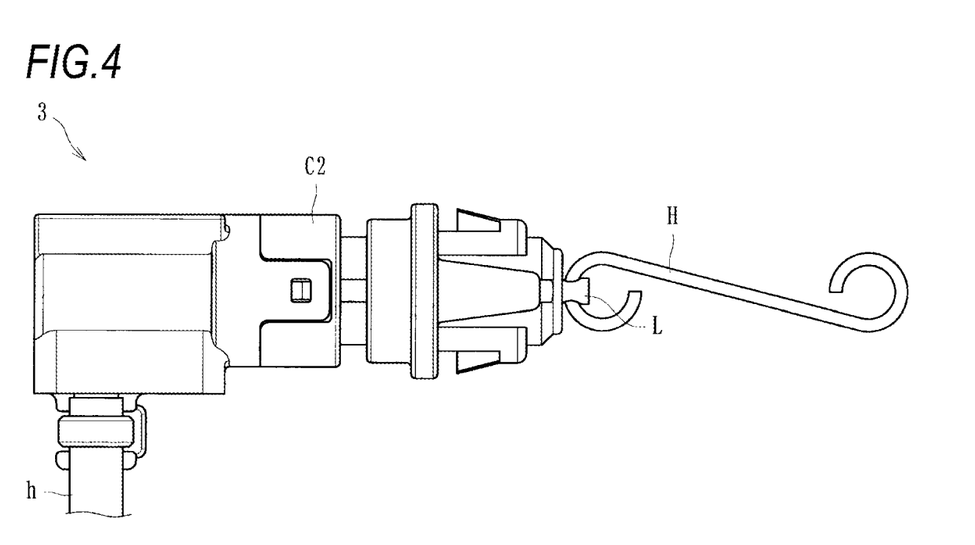
FIG. 4 is a two-side view showing an operation detection unit that detects an operation amount of a foot brake in a vehicle control system.
Figure 5:
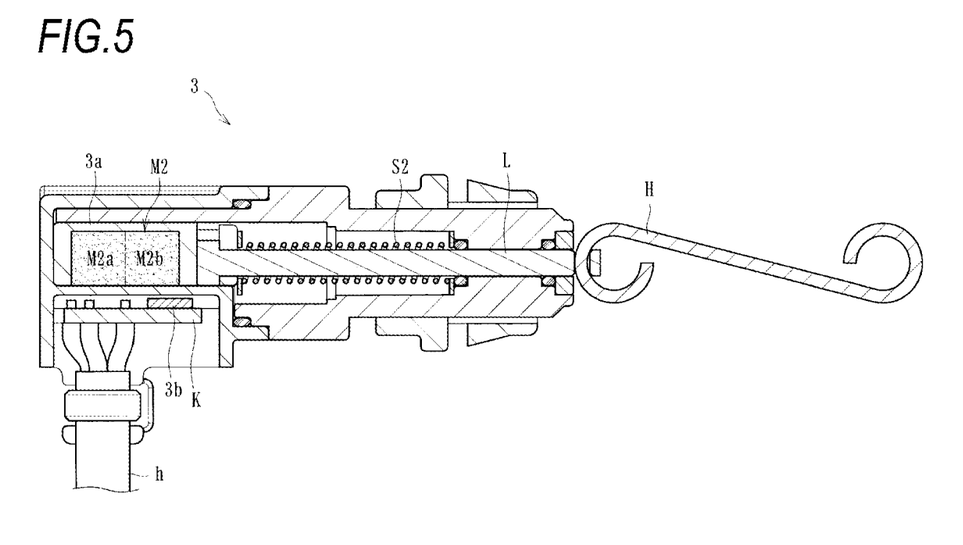
FIG. 5 is a cross-sectional view showing the operation detection unit.

The brake pedal c (an operation unit) is an operation lever that is attached to a position under a foot of the driver in the motorcycle, and that allows the driver to perform a brake operation on a rear wheel by swinging while stepping on the brake pedal c with the foot. The foot brake detection unit 3 is for detecting an operation on the brake pedal c, and includes a displacement unit 3a, a detection unit 3b, a spring S2 and a case C2 as shown in FIGS. 4 and 5. The case C2 is attached in vicinity of the brake pedal c in the motorcycle, and the displacement unit 3a is displaceably accommodated in the case C2.

The displacement unit 3a is displaced according to an operation amount of the brake pedal c, and is attached to a shaft member L having a hook-shaped member H. One end of the hook-shaped member H is attached to the shaft member L, and the other end thereof is attached to the brake pedal c. When the brake pedal c is swung, the shaft member L connected by the hook-shaped member H is pulled, and the displacement unit 3a can be slid (be displaced) linearly toward a right side in FIG. 5 against an urging force of the spring S2. The displacement unit 3a is configured such that a magnet M2 is attached to a predetermined position and the magnet M2 is displaced together with the displacement unit 3a.

The magnet M2 is disposed such that different polarities (for example, a portion M2a is an S pole and a portion M2b is an N pole, or the portion M2a is the N pole and the portion M2b is the S pole) are arranged in a displacement direction of the displacement unit 3a, and magnetism exerted on the detection unit 3b can be changed with displacement of the displacement unit 3a. The magnet M2 may be a permanent magnet or a magnet obtained by magnetizing a predetermined position of the displacement unit 3a.

The detection unit 3b detects a displacement amount of the displacement unit 3a and outputs a continuous signal corresponding to the displacement amount, and is formed of a Hall IC (a magnetic sensor) attached to a substrate K in the present embodiment. The Hall IC obtains an output voltage corresponding to a magnetic change from the magnet M2, and is fixed at a position facing the magnet M2 in the case C2. The detection unit 3b is electrically connected to the control unit 6 on the vehicle side by a wiring h, and the obtained output voltage (the continuous signal corresponding to the displacement amount) is output to the control unit 6.

However, when the brake pedal c is swung and the displacement unit 3a is slid (is displaced) in the case C2, and accordingly the magnet M2 is displaced to change the magnetism exerted on the detection unit 3b, a linear output voltage can be obtained by the detection unit 3b as shown in FIG. 11. That is, when output voltages of operation amounts α, β and γ on the brake pedal c are plotted on a graph and connected with a line, a continuous signal corresponding to displacement amounts of the displacement unit 3a (the operation amounts α, β and γ on the brake pedal c) can be obtained as shown in the drawing.

Figure 6:
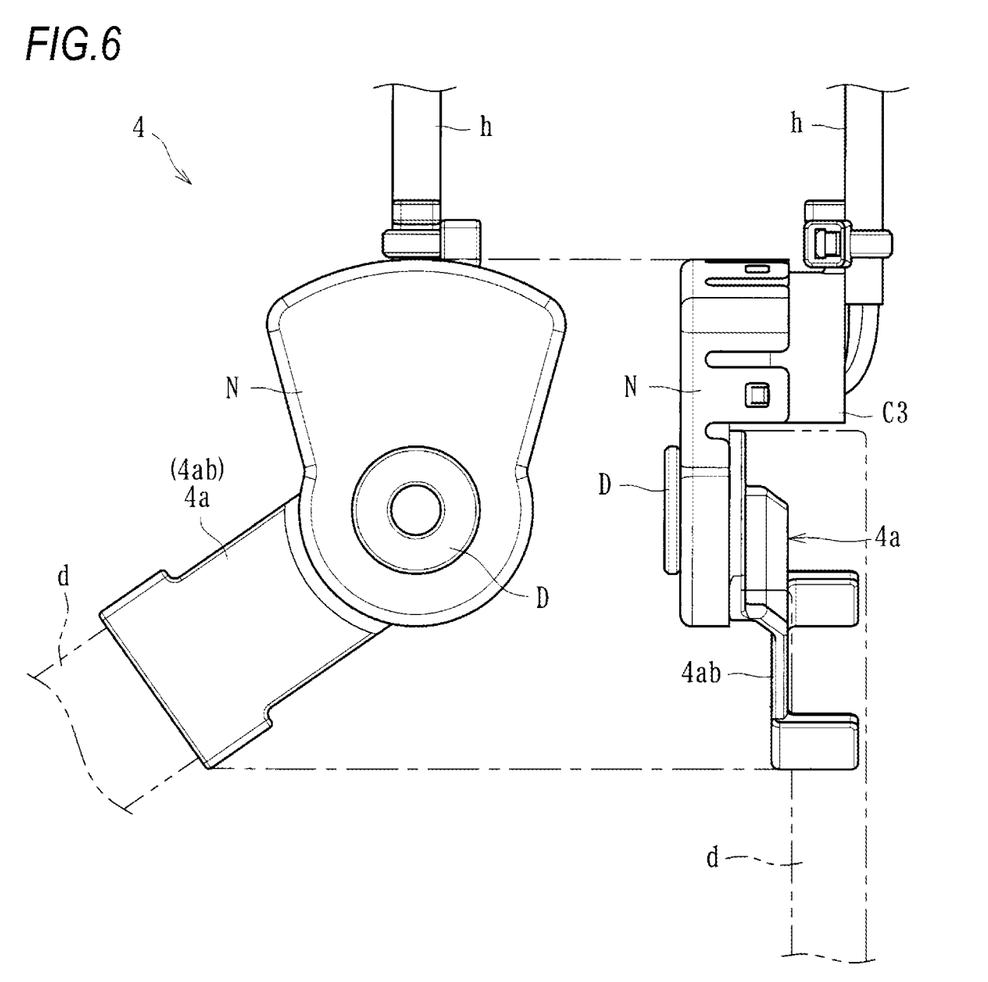
FIG. 6 is a two-side view showing an operation detection unit that detects an operation amount of a shift pedal in the vehicle control system.
Figure 7:
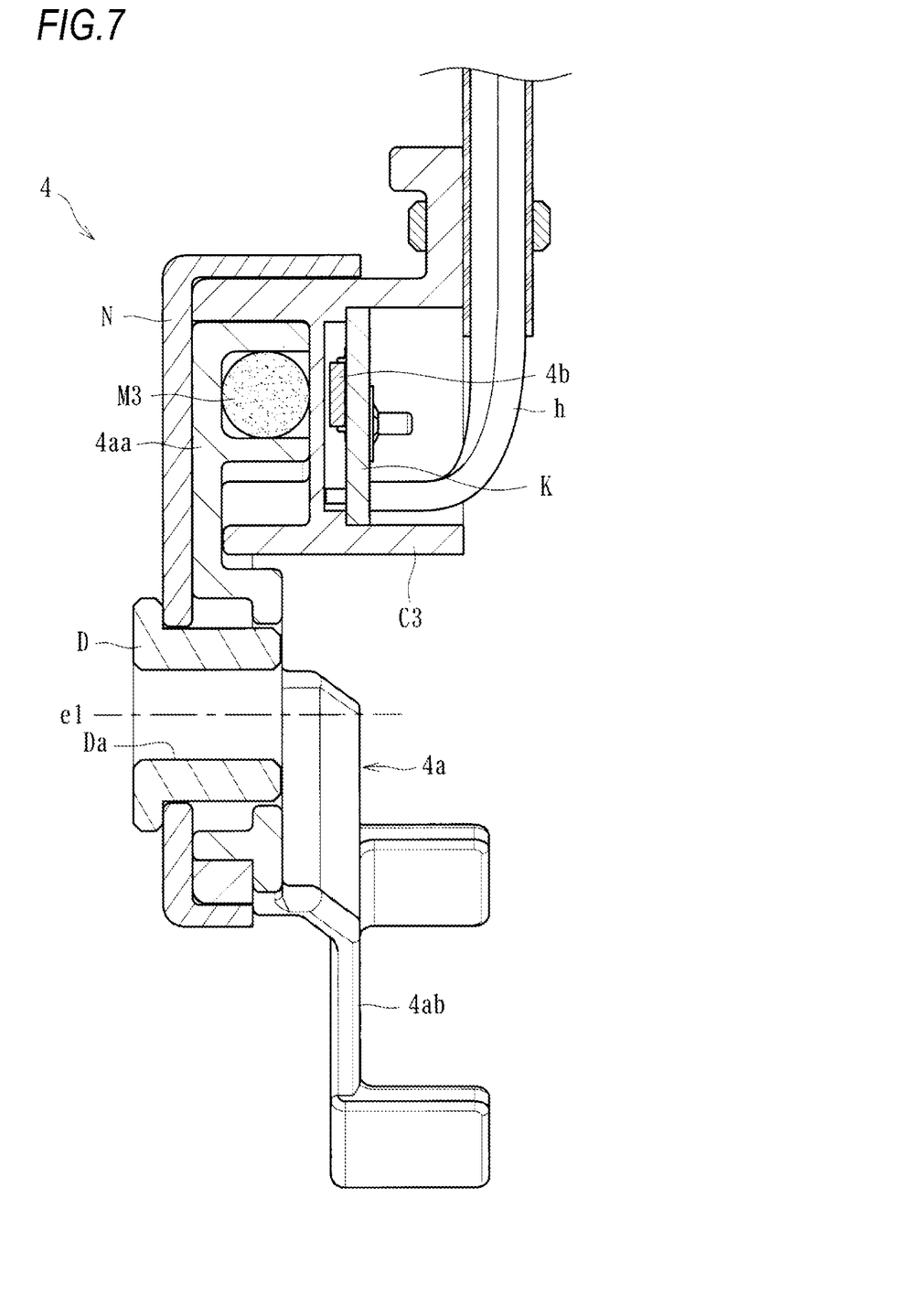
FIG. 7 is a cross-sectional view showing the operation detection unit.
Figure 8:
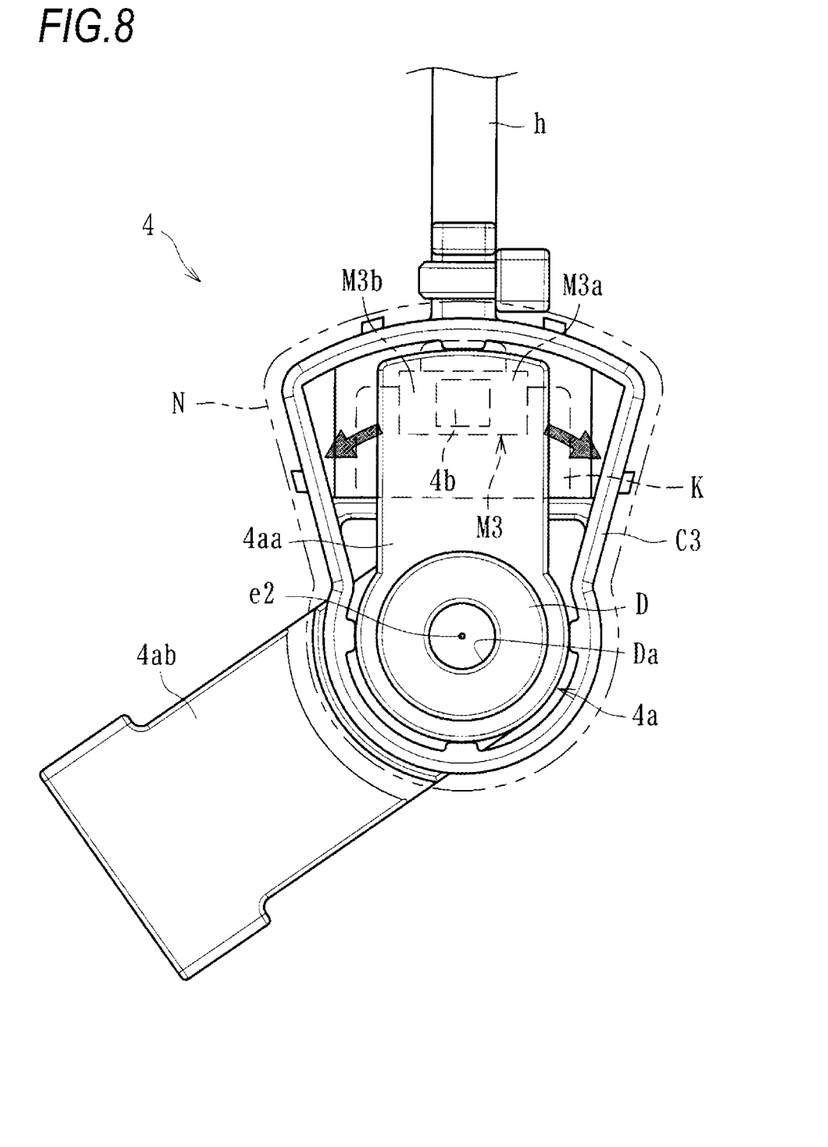
FIG. 8 is schematic view showing a positional relationship between a displacement unit and a detection unit in the operation detection unit.

The shift pedal d (an operation unit) is an operation lever that is attached to a position under a foot of the driver in the motorcycle, and that allows the driver to perform a shift operation by swing while stepping on the shift pedal d with the foot. The shift detection unit 4 is for detecting an operation on the shift pedal d, and includes a displacement unit 4a, a detection unit 4b and a case C3 as shown in FIGS. 6 to 8. The case C3 is attached in vicinity of the shift pedal d in the motorcycle, and the displacement unit 4a is displaceably accommodated in the case C3. In FIGS. 6 and 7, reference numeral N denotes a cover member.

The displacement unit 4a is displaced according to an operation amount of the shift pedal d, and is rotatably attached around the collar D as a center, with a displacement portion 4aa and an actuation portion 4ab being integrally formed. The collar D has an insertion hole Da through which a shaft member as a swing center of the shift pedal d can be inserted, and the actuation portion 4ab is attached to the shift pedal d. When the shift pedal d is swung, the displacement unit 4a rotates about an axis e1, and the displacement portion 4aa can rotate (be displaced) in an arrow direction in FIG. 8. The displacement portion 4aa of the displacement unit 4a is configured such that a magnet M3 is attached to a predetermined position and the magnet M3 is displaced together with the displacement unit 4a.

The magnet M3 is disposed such that different polarities (for example, a portion M3a is an S pole and a portion M3b is an N pole, or the portion M3a is the N pole and the portion M3b is the S pole) are arranged in a displacement direction of the displacement unit 4a, and magnetism exerted on the detection unit 4b can by changed with displacement of the displacement unit 4a. The magnet M3 may be a permanent magnet or a magnet obtained by magnetizing a predetermined position of the displacement unit 4a.

The detection unit 4b detects a displacement amount of the displacement unit 4a and outputs a continuous signal corresponding to the displacement amount, and is formed of a Hall IC (a magnetic sensor) attached to a substrate K in the present embodiment. The Hall IC obtains an output voltage corresponding to a magnetic change from the magnet M3, and is fixed at a position facing the magnet M3 in the case C3. The detection unit 4b is electrically connected to the control unit 6 on the vehicle side by a wiring h, and the obtained output voltage (the continuous signal corresponding to the displacement amount) is output to the control unit 6.

However, when the shift pedal d is swung and the displacement unit 4a rotates (is displaced) in the case C3, and accordingly the magnet M3 is displaced to change the magnetism exerted on the detection unit 4b, a linear output voltage can be obtained by the detection unit 4b as shown in FIG. 11. That is, when output voltages of operation amounts $\alpha$, $\beta$ and $\gamma$ on the shift pedal d are plotted on a graph and connected with a line, a continuous signal corresponding to displacement amounts of the displacement unit 4a (the operation amounts $\alpha$, $\beta$ and $\gamma$ on the shift pedal d) can be obtained as shown in the drawing.

Figure 9:
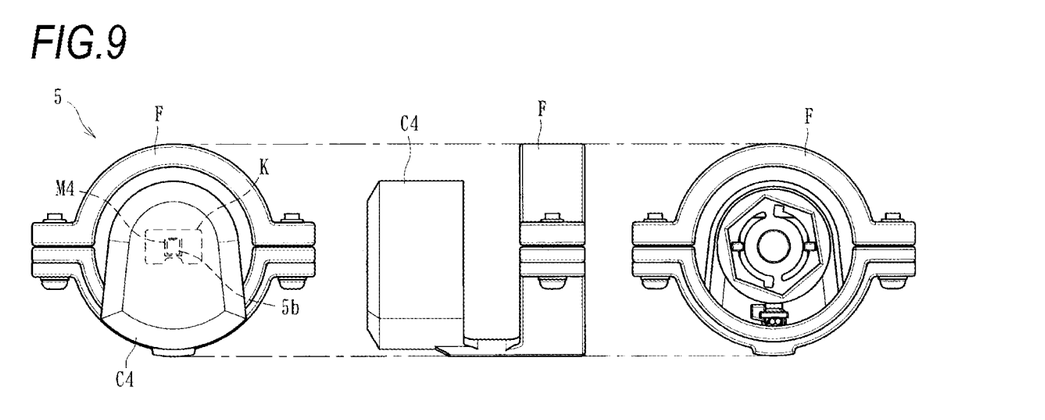
FIG. 9 is a two-side view showing an operation detection unit that detects an operation amount of a steering in the vehicle control system.
Figure 10:
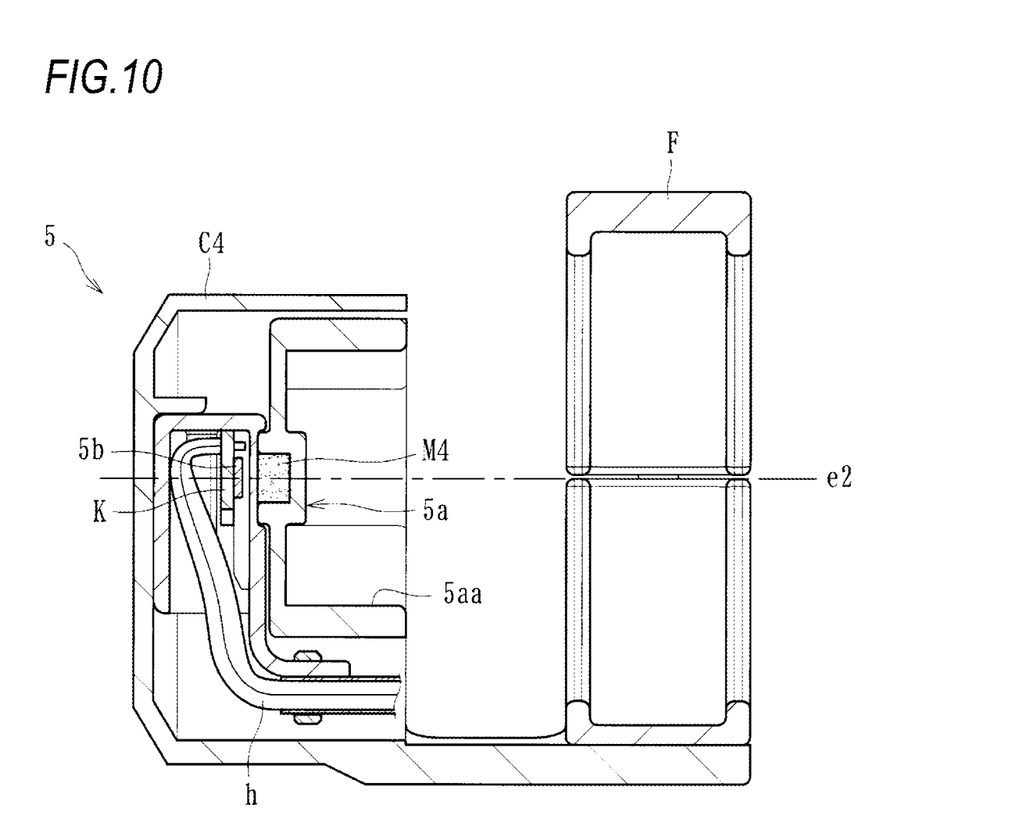
FIG. 10 is a cross-sectional view showing the operation detection unit.

The steering e (an operation unit) is formed of the handlebar in the motorcycle, and allows the driver to perform a steering operation by swinging while gripping the steering e. The steering detection unit 5 is for detecting an operation on the steering e, and includes a displacement unit 5a, a detection unit 5b and a case C4 as shown in FIGS. 9 and 10. The case C4 is attached in vicinity of the steering e in the motorcycle, and the displacement unit 5a is displaceably accommodated in the case C4. In FIGS. 9 and 10, reference symbol F denotes an attachment portion with respect to a vehicle.

The displacement unit 5a is displaced according to an operation amount of the steering e, and is formed of a cup-shaped member in which a recess 5aa capable of being attached by inserting through a rotation center axis of the steering e is formed. When the steering e is rotated, the displacement unit 5a can rotate (be displaced) about an axis e2. A magnet M4 is attached to a central portion of the displacement unit 5a and the magnet M4 is displaced together with the displacement unit 5a.

The magnet M4 is disposed such that different polarities (for example, S and N poles are alternately arranged in a circumferential direction) in a displacement direction (a rotation direction) of the displacement unit 5a, and magnetism exerted on the detection unit 5b can be changed with displacement of the displacement unit 5a. The magnet M4 may be a permanent magnet or a magnet obtained by magnetizing a predetermined position of the displacement unit 5a.

The detection unit 5b detects a displacement amount of the displacement unit 5a and outputs a continuous signal corresponding to the displacement amount, and is formed of a Hall IC (a magnetic sensor) attached to a substrate K in the present embodiment. The Hall IC obtains an output voltage corresponding to a magnetic change from the magnet M4, and is fixed at a position facing the magnet M4 in the case C4. The detection unit 5b is electrically connected to the control unit 6 on the vehicle side by the wiring h, and the obtained output voltage (the continuous signal corresponding to the displacement amount) is output to the control unit 6.

Thus, when the steering e is rotated and the displacement unit 5a rotates (is displaced) in the case C4, and accordingly the magnet M4 is displaced to change the magnetism exerted on the detection unit 5b, a linear output voltage can be obtained by the detection unit 5b as shown in FIG. 11. That is, when output voltages of operation amounts $\alpha$, $\beta$ and $\gamma$ on the steering e are plotted on a graph and connected with a line, a continuous signal corresponding to displacement amounts of the displacement unit 5a (the operation amounts $\alpha$, $\beta$ and $\gamma$ on the steering e) can be obtained as shown in the drawing.

The control unit 6 includes, for example, a microcomputer attached to the vehicle, inputs a continuous signal detected by the detection unit (1b, 2b, 3b, 4b, 5b), and performs a predetermined control corresponding to the continuous signal. The control unit 6 according to the present embodiment is electrically connected to a storage unit 7, and the continuous signal detected by the detection unit (1b, 2b, 3b, 4b, 5b) is stored in the storage unit 7. The storage unit 7 includes a storage medium such as a memory attached to the vehicle, and is configured to store the continuous signal output from the detection unit and to arbitrarily output the signal.

In addition, the control unit 6 according to the present embodiment is electrically connected to a communication unit 8, and the continuous signal detected by the detection unit (1b, 2b, 3b, 4b, 5b) is communicated by the communication unit 8. The communication unit 8 includes a transmission unit (an antenna, an interface or the like) such as a radio wave attached to the vehicle, and is configured to input the continuous signal output from the detection unit and to arbitrarily transmit the signal.

Further, the control unit 6 according to the present embodiment is electrically connected to an electrical component 9, and is configured to control the electrical component 9 based on the continuous signal detected by the detection unit (1b, 2b, 3b, 4b, 5b). The electrical component 8 includes various components such as a brake lamp attached to the vehicle, and can change a lighting mode of the brake lamp (for example, blink or increase a light emission amount when a braking force is large) based on continuous signals, for example, detected by the detection unit 2b and 3b of the front brake detection unit 2 and the foot brake detection unit 3.

According to the present embodiment, the operation detection unit (the clutch detection unit 1, the front brake detection unit 2, the foot brake detection unit 3, the shift detection unit 4 and the steering detection unit 5) includes the displacement unit (1a to 5a) that is displaced according to an operation amount of the operation unit (a to e) and the detection unit (1b to 5b) that detects a displacement amount of the displacement unit (1a to 5a) and that outputs a continuous signal corresponding to the displacement amount, and the control unit 6 that inputs the continuous signal detected by the detection unit (1b to 5b) and performs a predetermined control corresponding to the continuous signal is provided. Therefore, the operation amount of the operation unit (a to e) can be detected, and information on traveling can be further enriched and utilized.

Since the control unit 6 according to the present embodiment stores the continuous signal detected by the detection unit (1b to 5b) in the storage unit 7, the operation amount of the operation unit (a to e) can be stored, and the stored operation amount of the operation unit (a to e) can be utilized as information on the traveling. Thereby, various information on the traveling can be enriched and stored, and analysis of subsequent driving, investigation of causes of traffic accidents and the like can be performed in more detail.

Since the control unit 6 according to the present embodiment allows the communication unit 8 to communicate the continuous signal detected by the detection unit (1b to 5b), the operation amount of the operation unit (a to e) can be communicated, and the communicated operation amount of the operation unit (a to e) can be utilized as information on the traveling. Thereby, communication between vehicles can be performed to make driving more smoothly and safely.

Since the control unit 6 according to the present embodiment controls the electrical component 9 provided in the vehicle based on the continuous signal detected by the detection unit (1b to 5b), the electrical component 9 can be controlled according to the operation amount of the operation unit (a to e). As described above, the electrical component 9 may be other electrical components (such as a turning lamp or a headlight) provided in the vehicle, in addition to the brake lamp.

Since the operation unit according to the present embodiment includes the clutch lever a or the brake lever b that operates a clutch or a front wheel brake of the vehicle, and the displacement unit (1a, 2a) is displaced according to an operation angle of the clutch lever a or the brake lever b, the operation amount of the clutch lever a or the brake lever b can be grasped and utilized as information on the traveling. Since the operation unit according to the present embodiment includes the foot brake c that operates a rear wheel brake of the vehicle, and the displacement unit 3a is displaced according to an operation angle of the foot brake c, the operation amount of the foot brake c can be grasped and utilized as information on the traveling.

Since the operation unit according to the present embodiment includes the shift pedal d that operates a transmission of the vehicle, and the displacement unit 4a is displaced according to an operation angle of the shift pedal d, the operation amount of the shift pedal d can be grasped and utilized as information on the traveling. Since the operation unit according to the present embodiment includes the steering e that steers the vehicle, and the displacement unit 5a is displaced according to an operation angle of the steering e, the operation amount (a steering angle) of the steering e can be grasped and utilized as information on the traveling.

Although the present embodiment has been described above, the present invention is not limited thereto. For example, the detection unit (1b to 5b) that detects the displacement amount of the displacement unit (1a to 5a) and outputs the continuous signal according to the displacement amount may cause a current change or a light change with displacement of the displacement unit (1a to 5a) in addition to using a magnetic field change of the magnets M1 to M4, and the continuous signal as shown in FIG. 11 may be output based on the change.

The operation unit (a to e) is not limited to the clutch lever a, the brake lever b, the brake pedal c, the shift pedal d and the steering e as in the present embodiment, and may be other operation units provided in the motorcycle (the vehicle). The object controlled by the control unit 6 may be other components, and the control unit 6 may control various locking units, safety mechanisms and the like of the vehicle. In the present embodiment, the present invention is applied to the motorcycle, but may be applied to other vehicles such as automobiles.

Other functions may be added to the vehicle control system, in which an operation detection unit includes a displacement unit that is displaced according to an operation amount of an operation unit and a detection unit that detects a displacement amount of the displacement unit and outputs a continuous signal according to the displacement amount, and a control unit that inputs the continuous signal detected by the detection unit and performs a predetermined control corresponding to the continuous signal is provided.

What is claimed is:

1. A vehicle control system comprising:
    an operation unit disposed in a vehicle and operable by a driver;
    an operation detection unit configured to detect an operation on the operation unit, and including a displacement unit that is displaced according to an operation angle of the operation unit, and a detection unit that detects a displacement amount of the operation angle of the displacement unit and that outputs a continuous signal according to the displacement amount; and
    a control unit that inputs the continuous signal detected by the detection unit and performs a predetermined control corresponding to the continuous signal is provided, wherein the control unit allows a communication unit to communicate between the vehicle and another vehicle with the continuous signal detected by the detection unit, wherein
    the signal comprises a voltage corresponding to a magnetic change from one or more magnets,
    at least one of the one or more magnets is arranged in a displacement direction of the displacement unit,
    the operation unit includes a brake lever that operates a front wheel brake of the vehicle and a foot brake that operates a rear wheel brake of the vehicle, and
    the displacement unit is displaced according to the operation angle of the brake lever and the foot brake.

2. The vehicle control system according to claim 1, wherein the control unit stores the continuous signal detected by the detection unit in a storage unit.

3. The vehicle control system according to claim 1, wherein the control unit controls an electrical component included in the vehicle based on the continuous signal detected by the detection unit.

4. The vehicle control system according to claim 1, wherein the detection unit comprises a magnetic sensor.

* * * * *